(12) United States Patent
Ratnakar (10) Patent No.: US 8,331,915 B2
(45) Date of Patent: Dec. 11, 2012

(54) SYSTEM, APPARATUS AND METHOD FOR GENERATING AND RANKING CONTACT INFORMATION AND RELATED ADVERTISEMENTS IN RESPONSE TO QUERY ON COMMUNICATION DEVICE

(76) Inventor: Nitesh Ratnakar, Elkins, WV (US)

( * ) Notice: Subject to any disclaimer, the term of this patent is extended or adjusted under 35 U.S.C. 154(b) by 514 days.

(21) Appl. No.: 12/508,550

(22) Filed: Jul. 23, 2009

(65) Prior Publication Data
US 2009/0300010 A1    Dec. 3, 2009

Related U.S. Application Data

(63) Continuation-in-part of application No. 11/308,900, filed on May 24, 2006, now Pat. No. 7,593,721, which is a continuation-in-part of application No. 11/164,318, filed on Nov. 17, 2005.

(51) Int. Cl.
*H04M 3/42* (2006.01)
*H04W 24/00* (2009.01)
*G06Q 30/00* (2012.01)
(52) U.S. Cl. .............. 455/414.2; 455/456.1; 705/14.1
(58) Field of Classification Search .......... 455/414.2, 455/456.1; 701/208; 705/14, 14.1
See application file for complete search history.

(56) References Cited

U.S. PATENT DOCUMENTS

2006/0286971 A1* 12/2006 Maly et al. ............. 455/415
* cited by examiner

*Primary Examiner* — Ariel Balaoing (57) ABSTRACT

The present invention relates to a method, system, and apparatus to download contact information of one or more entities in one or more geographic areas from remote server into die contact list of a communication device. Communication network between remote server and communication device; and contact information databases having identical data fields is provided in remote server and communication device. According to another aspect, communication device application having means to determine communication device location; and having means to retrieve contact information from communication device contact list in response to user query; and sort retrieved contact information in order of their proximity to communication device location is provided. According to another aspect of the invention; apparatus, method, and system for advertising on communication devices in conjunction with contact information of entities is provided. According to yet another aspect of the invention; means to determine popularity and ranking of contact information of entities is provided.

15 Claims, 11 Drawing Sheets

|  | ENTITY N | ENTITY N+1 |
|---|---|---|
| NAME |  |  |
| PHONE |  |  |
| FAX |  |  |
| STREET |  |  |
| CITY |  |  |
| STATE |  |  |
| ZIP |  |  |
| EMAIL |  |  |
| WEB SITE |  |  |
| GPS Co-ordinates |  |  |
| ADVERTISEMENT N |  |  |
| ADVERTISEMENT N+1 |  |  |
|  |  |  |

SYSTEM, APPARATUS AND METHOD FOR GENERATING AND RANKING CONTACT INFORMATION AND RELATED ADVERTISEMENTS IN RESPONSE TO QUERY ON COMMUNICATION DEVICE

FIELD OF INVENTION

The present invention relates to a method and system of entering contact information into contact lists of communication devices. The present invention also relates to an apparatus, method and system for advertising on communication devices such as cellular phones, and more specifically, to an apparatus, method and system for advertising on communication devices in conjunction with contact information of businesses and individuals saved in the contact list of said devices.

BACKGROUND & PRIOR ART

Contact list is a common feature in most communication devices; including cellular phones and landline phones. It is a convenient feature that enables callers to save contact information of businesses and individuals in the communication device, so callers do not have to memorize all contact information. Generally, a caller has to manually enter phone number and other contact information of businesses and individuals into the contact list of communication devices such as cellular phones, landline phones, etc. When the caller wishes to call a business or individual whose contact information has been saved in the contact list of communication device, he or she is required to select the phone number of the said business or individual from the contact list of said communication device and then select the auto dial feature of communication device to automatically dial the selected phone number. This has the advantage of not requiring the caller to remember phone numbers and other contact information of businesses and individuals; which would otherwise be challenging and impractical. The automatic dial feature of communication device enables callers dial phone number from the contact list of communication devices without having to manually dial said number. Particularly, this feature allows driver to safely make a phone call while driving, as it enables them to automatically make a phone call from the contact list of communication device without having to divert attention away from driving to manually dial a phone number.

However, present communication devices have significant limitations with respect to the features, functionality and management of their contact list; namely, these devices 1) require manual entry of contact information into the contact list; 2) allow retrieval of contact information of only those businesses and individuals whose contact information have been saved in the contact list. When the caller has to call a business or individual not listed in the contact list of communication device, he or she has to look up contact information of said business individual at external resources such as the 'yellow book', directory assistance, Internet, etc. Once said contact information is found, it has to be manually entered and saved into the contact list of communication device. This a cumbersome and time consuming process, especially when the caller desires to save contact information of multiple businesses and individuals into the contact list of the communication device. Also, it is not possible to search for contact information from external sources such as 'yellow book', Internet etc. at all times, simply because the resources needed to do so are not readily available at all times; for example while driving. Some modern communication devices, especially cellular phones, are web enabled and enable callers to access the Internet. This enables callers to find contact information of businesses and individuals by accessing resources available on the Internet. An example of such resource is www.yellowpages.com, which enables callers to find contact information of businesses. However, this system too has limitations and drawbacks; namely it 1) requires manual entry of desired business's or individual's information, such as name, location etc into the web browser; 2) does not enable callers to automatically save contact information obtained upon search into the contact list of communication devices; 3) does not enable callers to automatically dial phone number displayed in the search result; 4) requires new search for each business or individual, making it tedious and impractical for callers who need to find contact information of multiple businesses or individuals; 5) requires access to the internet every time contact information search is to be performed; and 6) requires subscription to wireless Internet service, which is usually quite expensive.

It is a known fact that most contact information search is done to find a phone number and other contact information of local businesses and individuals. It is also a known fact that individuals do a majority of commerce with local businesses and individuals, usually within a fifty-mile radius of their residence or place of work. However, there is no method, system or apparatus apparent in the prior art that would enable callers to download and save contact information of local businesses and individuals into the contact list of communication devices, without requiring them to manually enter contact information of each local business and individual. At present, saving contact information of local businesses and individuals into the contact list of communication devices is a cumbersome and time consuming process, and is unfeasible if caller wishes to save contact information of large number of local businesses and individuals.

Presently, communication devices such as cellular phones are not used to their fullest potential for the purpose of advertising products and services of businesses and individuals. With the ability to access the Internet on modern communication devices, advertising is gradually picking up the pace in the realm of communication devices. Most advertising presently done on communication devices is done in a web based environment. An example of such method is the 'wireless Google' at www.google.com where advertisements are displayed with search results generated in response to a caller's query. In this method, the caller is required to subscribe to the wireless Internet service, start internet browser on the communication device, access www.google.com and thereafter perform a search on www.google.com. Advertisements are displayed along with results of said search. As is evident, this method requires access to wireless Internet service, which is usually expensive and not available at all locations at all times. More importantly, callers are exposed to advertisements only at a time when they are accessing said web site, which comprises of only a small fraction of their airtime usage. Callers use majority of their airtime on communication devices making phone calls to other callers. In addition, such method of advertising is general in nature and does not enable businesses to micro target their advertisements, in ways that is made possible with the present invention. There is no apparent invention in the prior art which enables businesses and individuals to advertise in conjunction with phone calls made from communication devices such as cellular phones. Consequently, there still remains a need for an apparatus, system and method to enable businesses and individuals to advertise on communication devices, such as cellular phones, in conjunction with phone calls made from these devices.

OBJECTS OF THE INVENTION

The present invention is directed to a system and method that overcomes the aforementioned drawbacks. In one embodiment, the present invention provides a system and method to: 1) enable callers to download and save phone numbers and contact information of local businesses into their communication device, such as cellular phone, without needing to manually enter the said phone numbers and contact information; 2) enable callers to dial a number from the contact list of the communication device using its automatic dial feature; and 3) enable callers to search contact information of local businesses from the comprehensive contact information database of local businesses saved in the contact list of their communication device, without having the need to re-access an outside contact information database. Another goal of the present invention provides an apparatus, system, and method to enable businesses and individuals to advertise on communication devices, such as cellular phones, in conjunction with phone calls made from these devices more specifically, the present invention provides an apparatus, system, and method to enable businesses and individuals to advertise on communication devices in conjunction with contact information saved in the contact list of said communication devices.

SUMMARY OF THE INVENTION

Therefore according to one aspect, means is provided for callers to download the contact information of local businesses from a 'central contact information database' saved on a remote server into the contact list of their communication device, without having the need to manually enter the said contact information. The 'central contact information database' contains contact information of local businesses in one or more geographical areas. According to another aspect, callers are provided means to utilize the auto dial feature of the communication device to automatically dial a selected phone number from their contact list. According to another aspect, callers are provided with means to automatically download contact information of local business in a new location into the contact list of personal communication device when said communication device is in new location. The present invention will improve commerce between local residents and local businesses by making contact information, including phone numbers, of local businesses readily available to local customers on their personal communication device; without ever requiring them to manually enter each of the said contact information individually into the personal communication device. It enables callers to automatically save contact information of a large number of local businesses in their personal communication device; without the need to manually enter such contact information, which is cumbersome and often unfeasible; especially when the contact information data is large. The present invention also relates to an apparatus, method, and system for advertising on communication devices such as cellular phones. A 'central contact information database' containing contact information of businesses and individuals is created. The 'central contact information database' is saved in a 'central server'. One or more advertisements in the form of data, audio, video, or image file or a combination thereof is paired to on or more contact information contained in the 'central contact information database'. An advertisement is paired with contact information by means of attachment to corresponding contact information or by means of a link to corresponding contact information. According to one aspect, means is provided for callers to download contact information and corresponding advertisements from the 'central contact information database' into the contact list of communication device. Advertisement is displayed on communication device when corresponding contact information is displayed or when corresponding contact information is retrieved from the contact list of communication device. According to another aspect of the invention means, methods and apparatus to generate a ranking system for contact information and advertisements are disclosed.

DETAILED DESCRIPTION OF THE INVENTION

Figure 1:
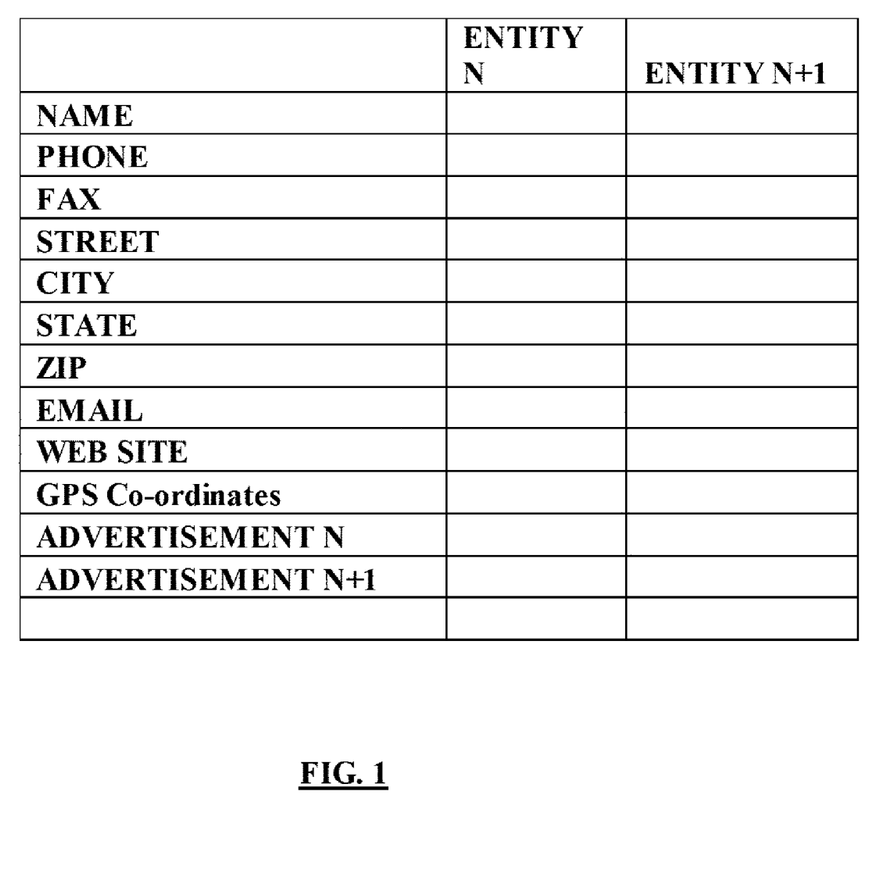
FIG. 1 shows the structure of the 'central contact information database' with means to save advertisements paired with contact information saved therein.
Figure 2:
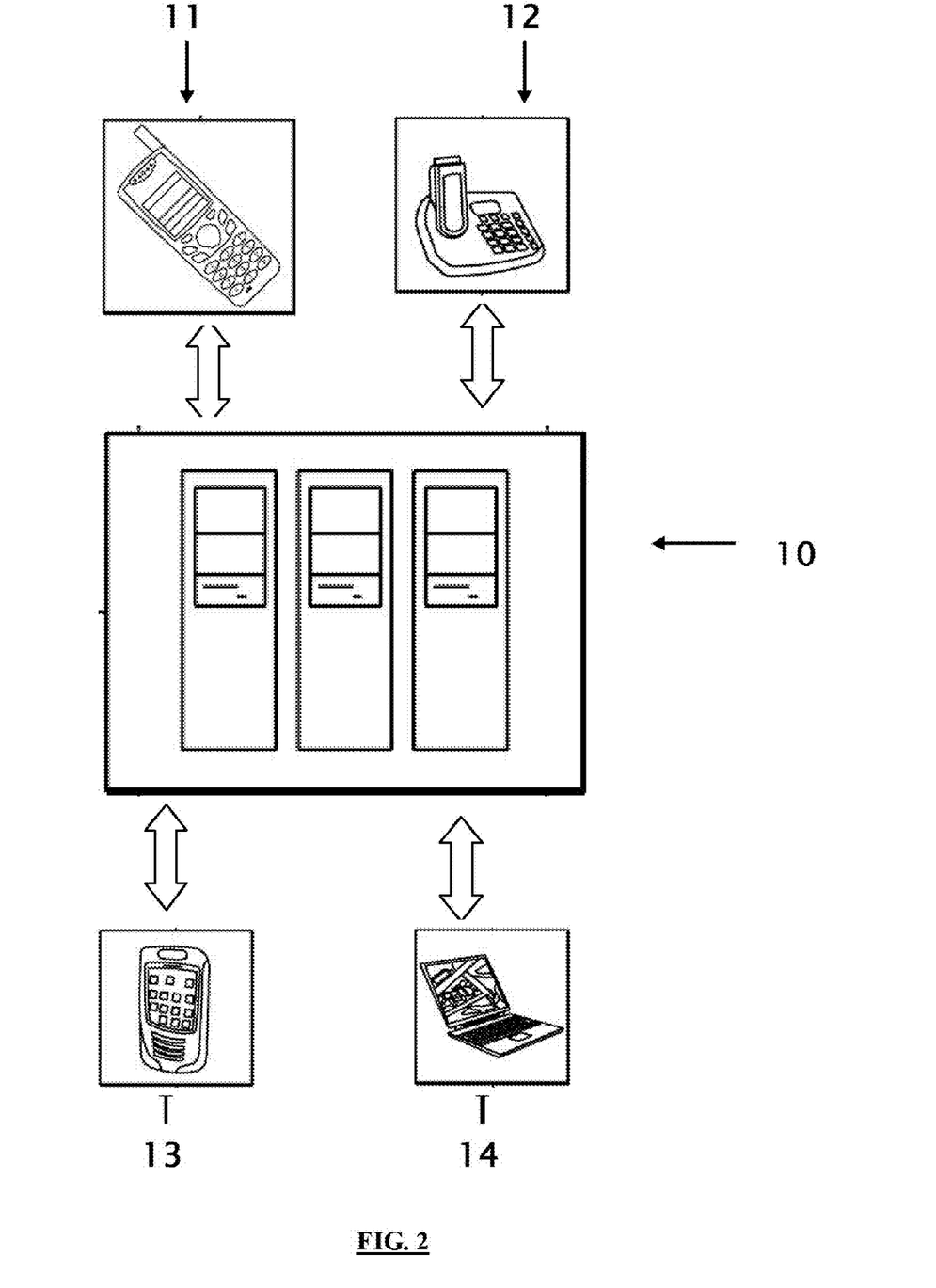
FIG. 2 shows the 'central server' containing the 'central contact information database' and an overview of the process of transfer of contact information and advertisements between the 'central server' and communication devices.

According to one aspect of the invention, a 'central contact information database' containing contact information of businesses and individuals is created. The stricture of the 'central contact information database' is shown in FIG. 1. Contact information contained in the 'central contact information database comprises of business individual's name, phone number, fax number, street address, city, state, postal code, email, web URL and any additional information like business hours, driving direction or any other pertinent information. The 'central contact information database' can be created using one or many available database programs like My SQL, MSSQL, MS Access and the like. The 'central contact information database' is saved in a remote device; e. g. 'central server' (10) as shown in FIG. 2. According to one method, contact information is entered into the 'central contact information database' in a web-based environment. Web portal is provided for businesses and individuals to enter contact information into the 'central contact information database'. According to another method, contact information of businesses and individuals is imported into the 'central contact information database' from an existing contact information database. One example of such a source is the 'Yellow Pages', which is published both in print form and online at www.yellowpages.com. Means is provided in the 'central contact information database' to sort contact information contained therein, according to multiple variables such as city, postal code, location, state, type or category of business, name of business or individual, hours of operation etc.

Figure 3:
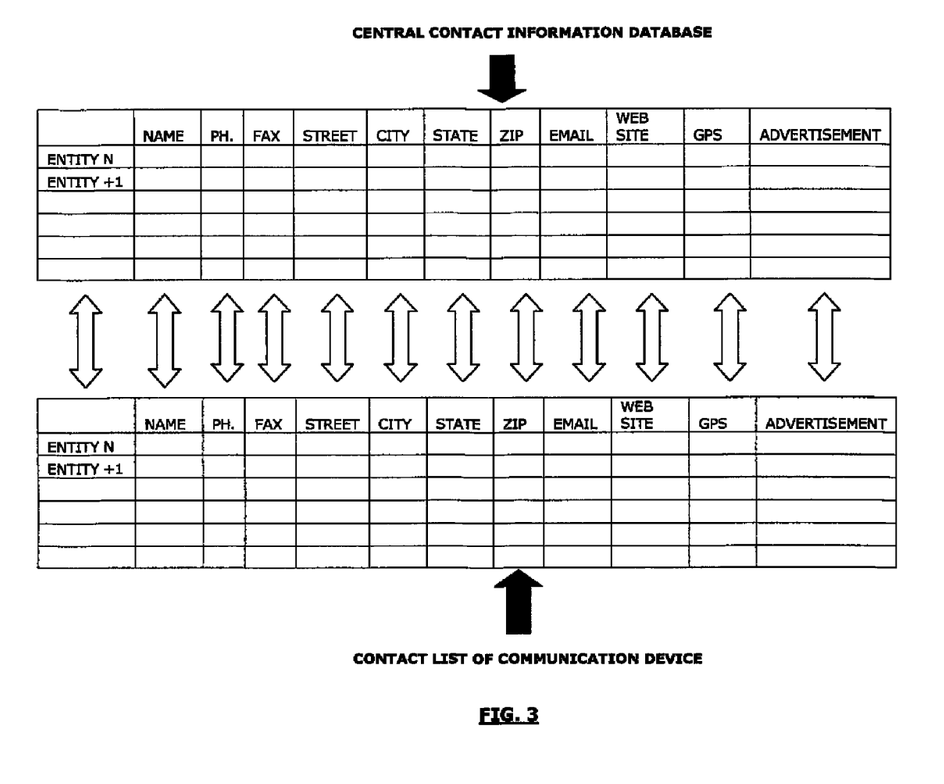
FIG. 3 illustrates the similarity of data fields in the 'central contact information' database and the contact list database of communication devices. It also illustrates the method of transfer of data contained in corresponding data fields of the 'central contact information' database and the contact list of communication devices.

According to another aspect of the invention means is provided for callers to download and save contact information of businesses and individuals from the 'central contact information database' into the contact list of communication devices such as cellular phones (11), landline phones (12), personal computers (14), PDA (13) etc as shown in FIG. 2. The database structure of the contact list of communication devices is similar to that of the 'central contact information database as shoe in FIG. 3. Data fields contained in the contact list of communication device are similar to data fields contained in the 'central contact information database'. Data can be downloaded into the communication device contact list directly or via an interface; such as contact information is sent to communication device via a SMS message, where after it is saved into contact list after approval from the user. Data from one field of the 'central contact information database' is transferred and saved into corresponding data field of the contact list of communication devices. Thereafter contact information can be searched and accessed from within the contact list of communication devices without the need to re-access the 'central contact information database'. Means is provided to enable callers to download contact information of a group of businesses or group of individuals from the 'central contact information database' into the contact list of communication device. For example, contact information data of 1) all local businesses within a certain mile radius of a postal code; 2) all local businesses in a particular business category: and/or 3) selected local businesses, etc can be downloaded. This feature enables callers to save contact information of a group of businesses or individuals into the contact list of a communication device without needing to manually enter contact information individually. According to another method, means is provided for caller to download contact information of businesses from multiple geographic areas into contact list of communication device. Once downloaded and saved in the contact list of communication device, contact information data is searchable by business name, business category or other subcategory from within the communication device. Preferably, executable application is provided in communication dev ice to search and sort contact information according their proximity relative to the location of communication device. According to one method, GPS receiver in communication link with GPS satellites is provided in communication device. Communication device application having means to determine current location of communication device via GPS satellite position determination is provided. Thereafter, in response to search query from user; communication device application retrieves relevant contact information from contact list contained in communication device and displays retrieved contact information in order of their proximity relative to the location of communication device. Contact information is displayed on communication device; in order of the proximity of business corresponding to contact information relative to the communication device location. According to this method, GPS coordinates corresponding to contact information is saved in central server contact information database and is downloaded into the contact list of communication device; as shown in FIGS. 1 & 3. GPS coordinates corresponding to contact information of entities can be obtained from many available geo-code databases. Alternate means of determination of communication device location such as cellular tower triangulation, access point location determination, IP address determination and the like may be used instead of GPS coordinates determination. According to above alternate positioning methods, contact information retrieved from contact list of communication device is sorted in order or proximity of retrieved contact information to the location of communication device.

Accordingly, when a caller has to call a business or individual, he or she searches for said business's or individual's contact information in the contact list of communication device and thereafter dials phone number contained therein without needing to search for said contact information elsewhere. Preferably an auto dial feature is provided in the communication devices. According to another aspect, when a caller travels to a different location, he or she is provided means to download contact information of local businesses and individuals in the caller's new location. Caller is required to enter his or her new location into the system and thereafter download contact information of local businesses and individuals into the contact list of communication device. For example, when caller travels from Chicago, Ill. to New York, N.Y., he or she can download contact information of local businesses in New York, N.Y. (example all coffee shops in New York, N.Y.; or all local businesses in Postal code 07024 and the like) into caller's coiutmication device. According to yet another method, contact information of local businesses and individuals in caller's location is automatically downloaded into caller's communication device based on automatic determination of the location of communication device. The location of communication device can be automatically determined by the system using one of many available methods, like Global Positioning System (GPS), originating cellular tower location, location of landline phone, internet protocol (IP) address and the like. This provides callers means to automatically download contact information of local businesses and individuals into communication device, without requiring callers to enter their location into the system. This feature is particularly useful for callers who travel frequently. For example, a caller driving from Chicago, Ill. to New York, N.Y. wants to go to the nearest Wal-Mart store while driving through Cleveland, Ohio. Contact information of local businesses in Cleveland, Ohio is automatically downloaded into the caller's communication device, such as cellular phone, when caller enters Cleveland, Ohio. Ashen the caller searches for 'Wal-Mart' in the contact list of his or her communication device, such as cellular phone, while in Cleveland, Ohio contact information of Wal-Mart stores in Cleveland, Ohio is displayed. The communication device is preferably configured to download contact information in new location according to the criteria fed into the communication device for downloading contact information of businesses at the previous location. The caller may instead choose to enter new criteria for downloading contact information in the new location. According to another method, caller downloads contact information of businesses both in Chicago, Ill. and New York, N.Y. into contact list of communication device. Means, preferably GPS coordinates determination is provided in communication device to determine communication device location. When caller searches for business contact information in New York, N.Y., communication device application automatically searches, sorts, and displays contact information of businesses from contact information contained in contact list in communication device in order of their proximity of corresponding businesses to communication device location. Alternatively, according to another aspect of the invention, contact information of most frequently accessed contact information in contact list of communication device is automatically updated when caller moves to a new location. For example, if caller frequently uses contact information of Wal-Mart at home location, contact information of Wal-Mart at new location is automatically updated when caller moves to a new location. Executable application is provided on communication device to record instances of caller access to contact information contained in contact list of communication device and generate a list of most frequently called contacts.

According to yet another aspect of the present invention, the contact information database of local businesses is automatically downloaded into the communication device of a caller; based on automatic determination of the location of the said communication device. The location of the communication device can be automatically determined using one of many available methods, like Global Positioning System (GPS), originating cellular tower location, location of the landline phone, internet protocol (IP) address and the like. This aspect of the present invention gives the caller means to download the contact information database of local businesses into his communication device, without having the need to enter information about his location. This feature is particularly useful for callers who travel frequently. For example, a caller driving from Chicago, Ill. to New York, N.Y. wants to go to the nearest Wal-Mart store while driving through Cleveland, Ohio. The contact information database of local businesses in Cleveland, Ohio is automatically downloaded into his cellular phone or any other communication device when he enters Cleveland, Ohio. When the said caller searches for 'Wal-Mart' in the contact list in his cellular phone, the contact information of Wal-Mart stores in Cleveland, Ohio is displayed. The communication device is preferably configured to download contact information in new location according to the criteria fed into the communication device for downloading contact information of businesses at the previous location. The caller may instead choose to enter new criteria for downloading contact information in the new location.

In the preferred methods of the present invention, the contact information database of local businesses is downloaded and saved in a communication device. However, according to another method of the present invention, the contact information database of local businesses is stored in a remote central server and accessed remotely by various communication devices. According to this method, a caller dials a pre-determined number from his communication device and enters the location, name or category of the business for which he would like to obtain the contact information. Alternatively, the location of the caller is determined automatically by determining the location of his communication device using one of many available systems like global positioning system (GPS), originating cellular tower location, location of the landline phone, internet protocol (IP) address and the like. Once the central server with the 'central contact information database' receives the said information, the contact information of the selected business is transmitted to the caller's communication device, where the said contact information is displayed. In the preferred method, the said communication device is enabled to automatically dial the phone number from the displayed contact information using the auto dial feature. In addition, means are provided for the said communication device to save the displayed phone number and contact information into its contact list. According to vet another method of the present invention; the entire 'central contact information database' can be downloaded from the central server into a communication device, where after contact information of local businesses in the area of the location of a communication device can be searched from within the contact list of the communication device. In this method, the location of the communication device is again determined by either 1) manually entering the location into the said device; or 2) by automatic determination of the location of the said communication device using one of many available systems like global positioning system (GPS), originating cellular tower location, location of the landline phone, internet protocol (IP) address and the like.

Figure 4:
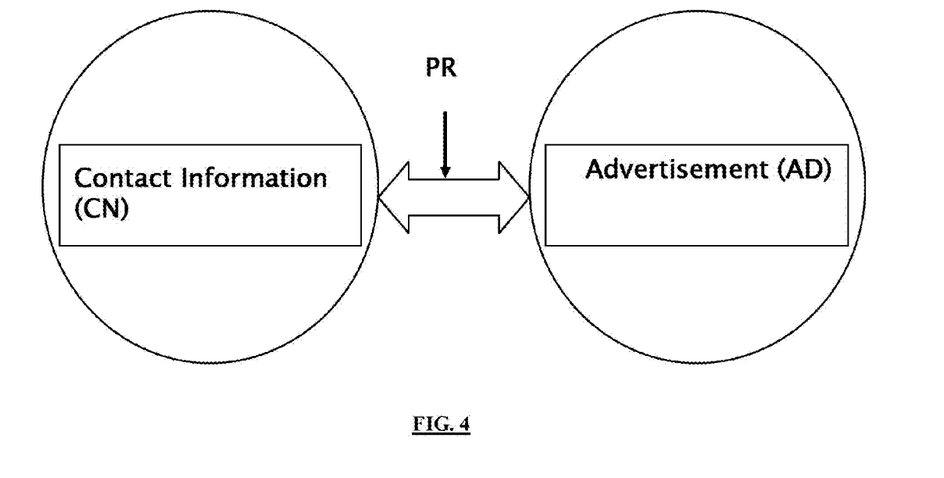
FIG. 4 shows the method of pairing of advertisement with corresponding contact information in the 'central contact information' database.

According to another aspect of the invention, advertisements, in the form of audio, video, image, data or a combination thereof, are saved in the 'central contact information database' as shown in FIG. 1. Means is provided in the 'central server' (10) to pair (PR) advertisements (AD) with corresponding contact information (CN), as shown in FIG. 4. Advertisements are saved or displayed with corresponding contact information in the 'central contact information' database, as shown in FIG. 1. Means is provided to pair multiple advertisements to a given contact information. Additionally, means is provided to pair an advertisement to multiple contact information. According to one method, a web portal is provided to enable businesses and individuals to find suitable contact information of businesses and individuals with which to pair advertisements. The said web portal lists contact information of businesses and individuals listed in the 'central contact information database'. Means is provided in the web portal to generate and display 'relevance profile'. 'download statistics' and 'usage statistics' of contact information listed thereon. 'Relevance Profile' of contact information provides detail information about the corresponding business or individual. Relevance Profile is determined according to business contact information entered into the central server contact list. 'Download Statistics' of contact information is a measure of the information of communication devices on which said contact information has been downloaded from central server. Central server application having means to record instances of download of contact information and advertisement from contact database saved in central server is provided. Central server application contains executable computer program to record instances of caller download of contact information and advertisement from central server into communication device. Such means is widely known in the field of computer programming and does not merit further details. Additionally central server application also contains executable computer program to rank contact information and advertisement according to the instances of download into remote communication devices. 'Usage statistics' of a contact information/advertisement is a measure of popularity and shows instances when a contact information/advertisement have been retrieved by callers from contact list of communication devices. Communication device application having means record instances of caller retrieval of contact information and advertisement from internal memory of communication device is provided. Communication device application contains executable computer program to record instances of caller retrieval of contact information from contact list of communication device and furthermore save usage statistics into the internal memory of communication device. Means is provided in communication device application to communicate 'usage statistics' to central server at predetermined intervals/events. An application is provided in central server to compile usage statics from multiple communication devices, and generate a 'comprehensive usage statistics' for contact information and advertisement. The 'comprehensive usage statistics' for contact information and advertisement is made available to businesses wishing to pair advertisement with said contact information. It is envisioned that contact information and advertisement having higher 'comprehensive usage statistics will have higher commercial value. Preferably, 'Download Statistics' and 'Usage Statistics' also provides caller demographic information such as location, age, gender, etc. These measures provide advertisers means to find suitable businesses and individuals to pair an advertisement. An advertiser may pair advertisements with his or her contact information or may pair advertisement with contact information of other businesses and individuals, selected after due diligence. Preferably, advertisements are paired with contact information in a dynamic environment wherein means is provided for businesses and individuals to pair an advertisement with different contact information at different times.

Figure 5:
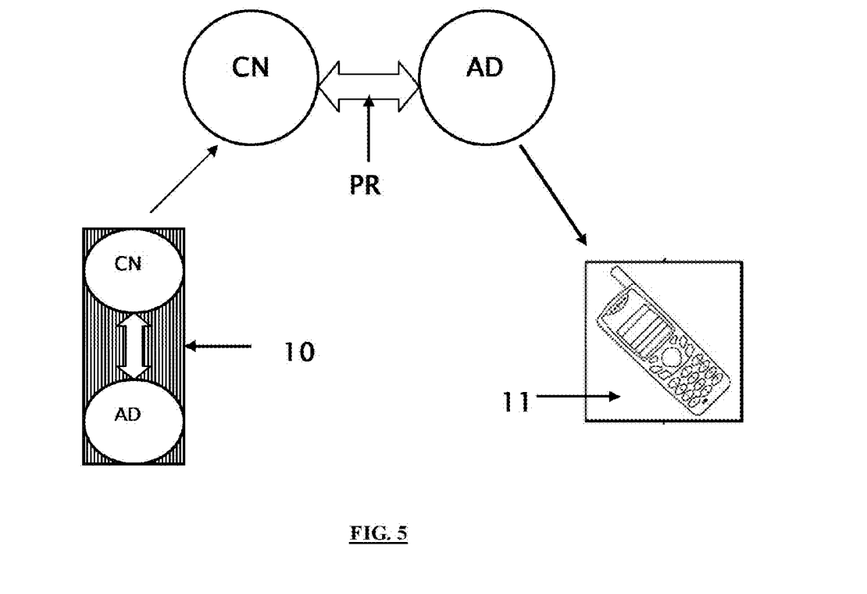
FIG. 5 shows the method of transfer of contact information and advertisement paired therewith from the 'central server' to communication device.

When contact information (CN) is transmitted from the 'central contact information database' in the 'central server' (10) to communication device (11), an advertisement (AD) paired (PR) with said contact information (CN) is also transmitted, as shown in FIG. 5. In the preferred method, means is provided in communication device to save advertisements in the contact list with corresponding contact information, as shown in FIG. 3. An interface between the 'central contact information database' and the contact list of communication device is created which enables these two databases to communicate with each other. Means is provided to synchronize information contained in the contact list of communication device with the 'central contact information database' at regular intervals using principles shown in FIG. 3. This ensures that information contained in the contact list of communication device remains current. This enables making the process of pairing of advertisements with contact information in the 'central contact information' database dynamic, flexible and scalable. Advertisements contained in the 'central contact information database' can be changed or modified at any time. The said change or modification will accurately reflect in communication device once said communication device has synchronized with the 'central contact information database'. Means is provided in communication device to display advertisements, preferably at a time when corresponding contact information is displayed on communication device or when corresponding contact information is retrieved from contact list of said communication device by caller.

Figure 6A:
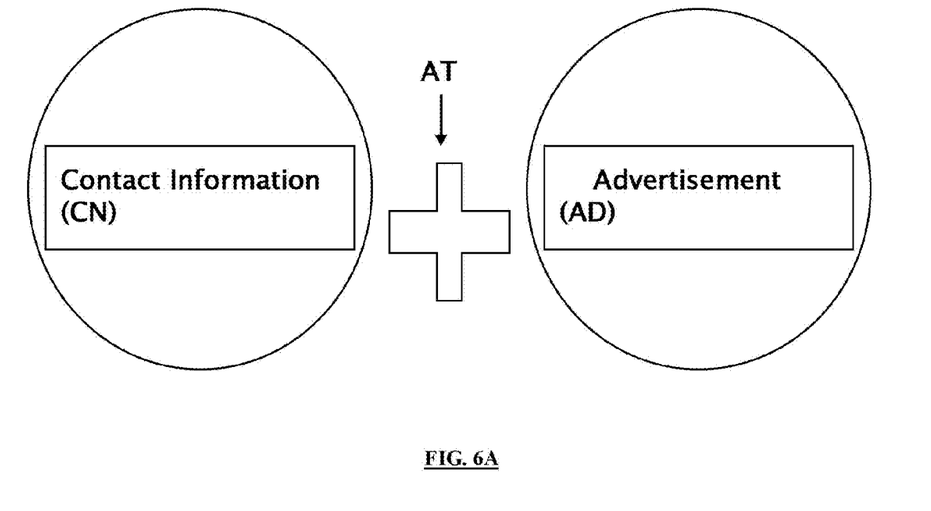
FIG. 6A illustrates the method of pairing of advertisement with contact information in the 'central contact information' database; wherein the advertisement and corresponding contact information are attached together.
Figure 6B:
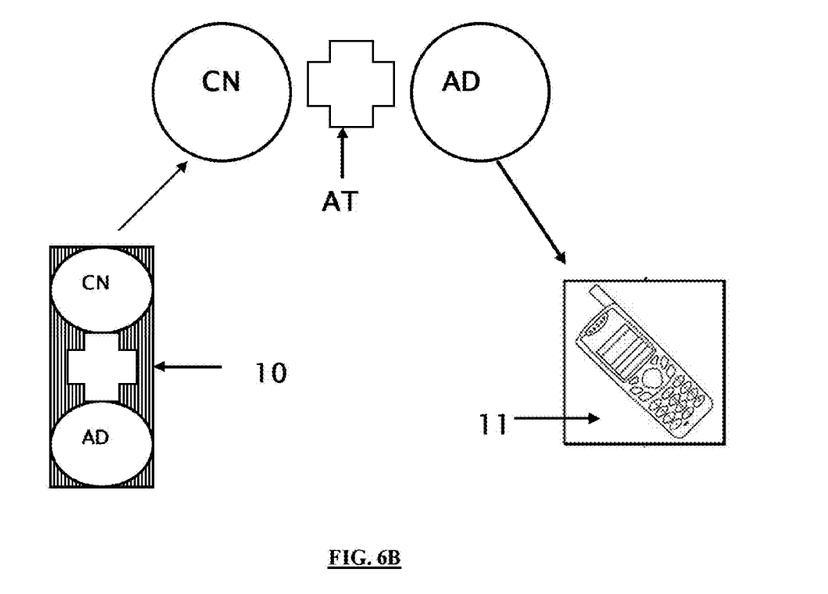
FIG. 6B shows the method of transfer of contact information and advertisement attached therewith from the 'central server' to communication device.

Advertisements and contact information can be paired in the 'central contact information database' in two ways. According to one method shown in FIG. 6A, advertisement (AD) is attached (AT) to corresponding contact information (CN) in the 'central contact information database'. When contact information (CN) is transmitted from 'central server' (10) to communication device (11), corresponding advertisement (AD) attached there to is transmitted as well, as shown in FIG. 6B. In this method, advertisement is saved and/or displayed along side corresponding contact information in the contact list of communication device. Consequently, large memory capacity is required in communication device in order to save large number of contact information and corresponding advertisements.

Figure 7A:
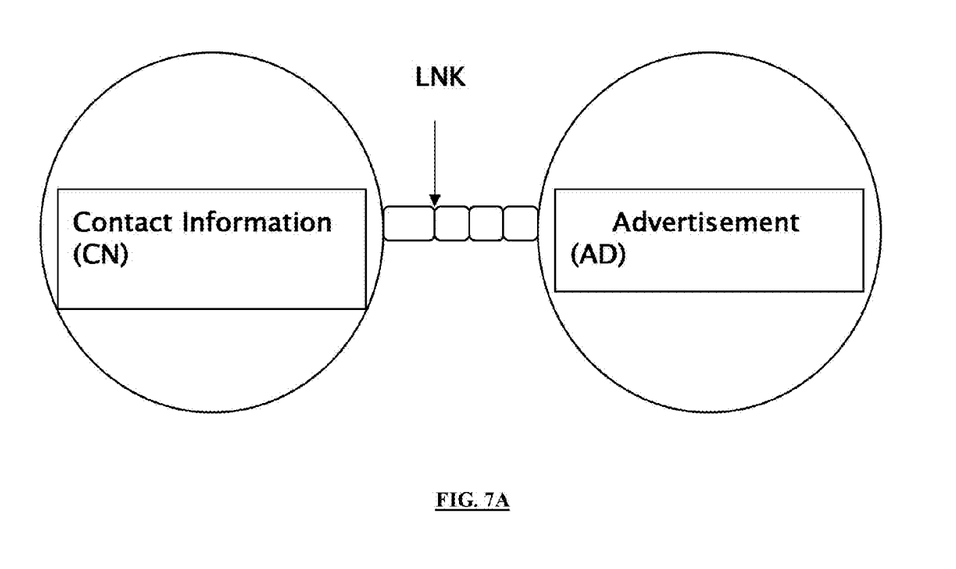
FIG. 7A illustrates pairing of advertisement with contact information in the 'central contact information' database by means of a 'link'.
Figure 7B:
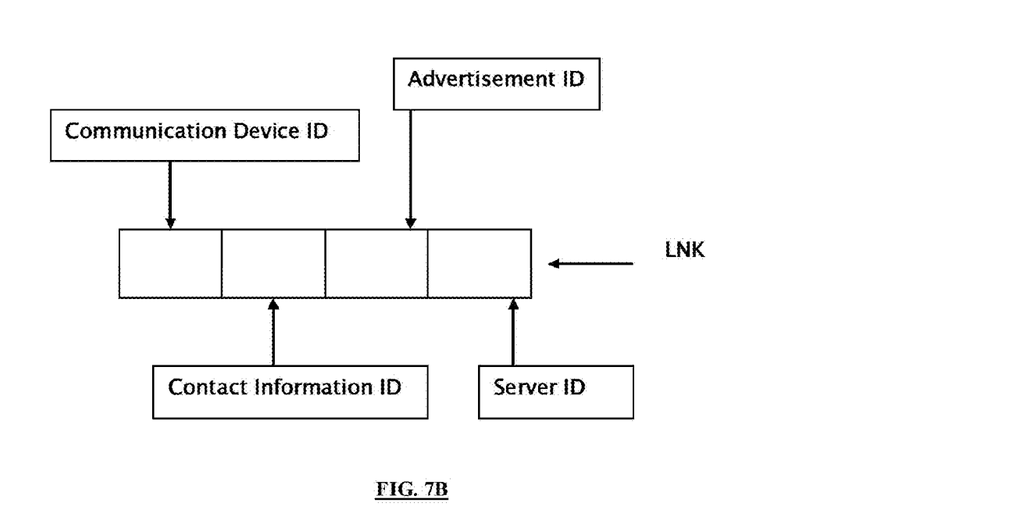
FIG. 7B shows the components of the 'link' that pairs advertisement with contact information in the 'central contact information' database.
Figure 7C:
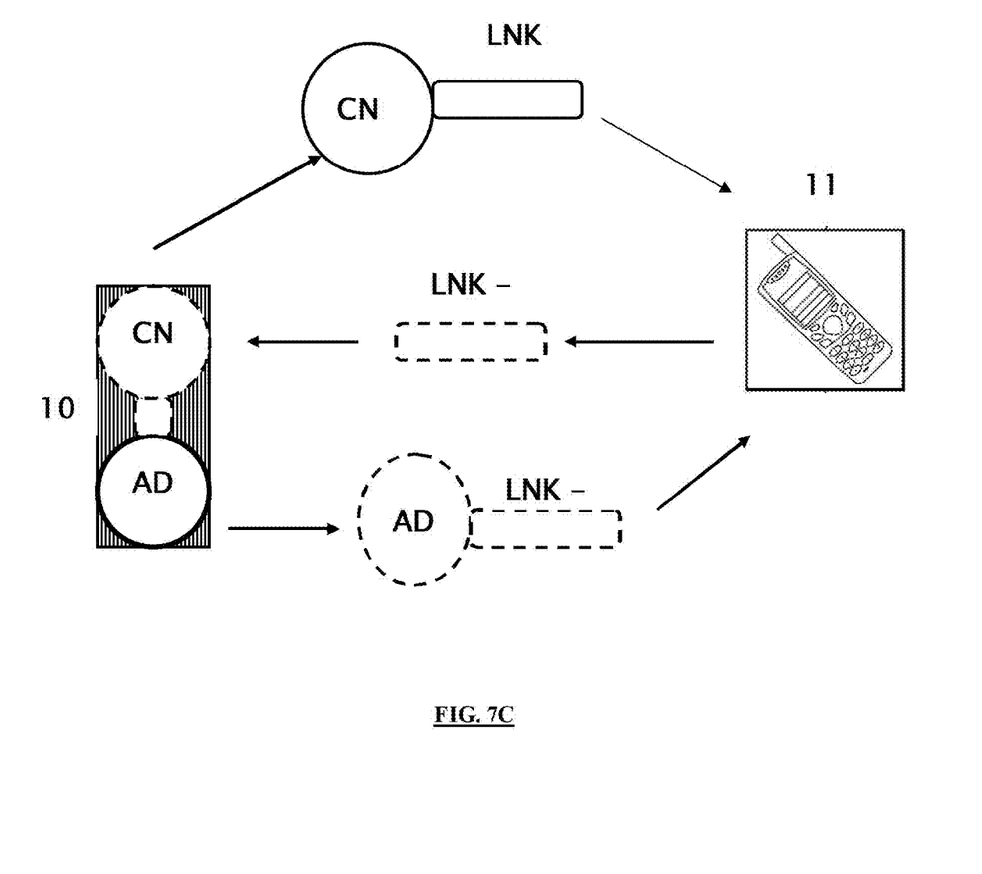
FIG. 7C shows the method of transfer of contact information and advertisement paired therewith from the 'central server' to communication device when said pairing is done by means of a 'link'.

According to another method, advertisements (AD) are saved in the 'central server' (10) separate from contact information in the 'central contact information database'. Alternatively, advertisements can be saved in a separate server altogether. Each advertisement has an attached female link that is responsive to male link (ID) of corresponding contact information (CN). Contact information (CN) in the 'central contact information database' is paired with corresponding advertisement (AD) by means of a 'link (LNK)', as shown in FIG. 7A. FIG. 7B shows details of the 'link (LNK)'. The 'link (LNK)' is attached to corresponding contact information and comprises: 1) ID (male link) of the advertisement that it is linked to; 2) ID of the server where advertisement corresponding to said link is saved; 3) ID of contact information to which said link is attached; and 4) ID of communication device where said 'link' is saved upon transmission of corresponding contact information. As shown in FIG. 7C, when contact information (CN) is transmitted from 'central contact information database' in 'central server' (10) to communication device (11), the 'link' (LNK) attached to said contact information (CN) is transmitted as well. Means is provided in communication device (11) to save both contact information (CN) and the 'link' (LNK) attached there to. Once the 'link' (LNK) is in communication device (11), means is provided to incorporate ID of said communication device into the 'link' (LNK). The 'link' (LNK) in communication device is activated (LNK-A) when corresponding contact information is displayed on said communication device or when caller retrieves corresponding contact information from the contact list of said communication device. Active 'link' (LNK-A) is transmitted back to the 'central server' (10) where corresponding advertisement (AD) is saved. Server ID contained in the 'link' (LNK) guides the active 'link' (LNK-A) to the 'central server' (10). Once in the 'central server' (10), advertisement ID contained in the active 'link' (LNK-A) is used to retrieve advertisement (AD) corresponding to the active 'link' (LNK-A) from the 'central server' (10) following which advertisement (AD) and active 'link' (LNK-A) is transmitted back to the communication device (11) where the active 'link' (LNK-A) originated. Communication device ID contained in the active 'link' (LNK-A) is used to direct the advertisement (AD) and the active link (LNK-A) to the communication device (11) where the active 'link' (LNK-A) originated. Once in the communication device (11), contact information ID contained in the active 'link' (LNK-A) guides the active 'link' (LNK-A) and advertisement (AD) attached therewith to corresponding contact information (CN) saved in said communication device (11). Means is provided in communication device (11) to display advertisement (AD) brought in with the active 'link' (LNK-A) from the 'central server' (10).

Although this method can work without saving advertisement in communication device, preferably means is provided in communication device to save advertisement brought in by the active 'link' from the 'central sender'. According to this method, only advertisements corresponding to contact information retrieved from the contact list by a caller would need to be saved in communication device (and not all advertisements corresponding to all contact information saved in contact list of communication device), thus obviating need for large memory capacity in the communication device. This method also enables faster synchronization of contact information and advertisements between communication device and the 'central contact information database'. In this method synchronization of only 'links' (and not advertisements) corresponding to saved contact information is required, and is hence faster.

According to another method, link attached to contact information is fixed; and the corresponding female link attached to the corresponding advertisements is dynamic i.e. the female link can be moved from one advertisement to the next. This way, different advertisements can be displayed at different times for the same contact information. Contact information is preferably sorted into pre defined groups; and similarly advertisements are sorted into pre defined groups. Compatibility quotients are assigned each pair of contact information and advertisement groups. Example, high compatibility quotient is assigned to pair group comprising of contact information for restaurants and advertisement group comprising grocery stores; as user looking for contact information of local restaurants may also be more inclined to buy grocery items for home kitchen. Advertisements having high compatibility quotient corresponding to contact information is dynamically linked when corresponding contact information is activated in communication device.

According to yet another method, advertisements are paired with contact information by means of link (LNK) attached to contact information. Contact information and links (LNK) attached thereto are saved in first database. Advertisements are saved in second database. First and second databases may be saved in one or multiple central servers. Means is provided in first database application to attach contact information to advertisement corresponding to advertisement ID contained in attached link (LNK) upon receipt of download request for contact information from communication device. Thereafter, contact information and corresponding advertisement is transmitted to communication device requesting download. Means is provided in communication device application to save contact information and attached advertisement into corresponding data fields of communication device contact list.

According to yet another method, 'central contact information database', link (LNK), and advertisements (AD) are saved in first, second and third databases respectively. The first, second and third databases can be on the same server or can be on multiple servers. Means is provided in first database application to attach contact information to link (LNK) containing corresponding contact information ID in second database; and attach link (LNK) to advertisement corresponding to advertisement ID in third database; upon user request for download of contact information into communication device. Thereafter, contact information and corresponding advertisement is transmitted to communication device requesting download. Means is provided in communication device application to save and/or display contact information and attached advertisement into corresponding data fields of communication device contact list.

Figure 7D:
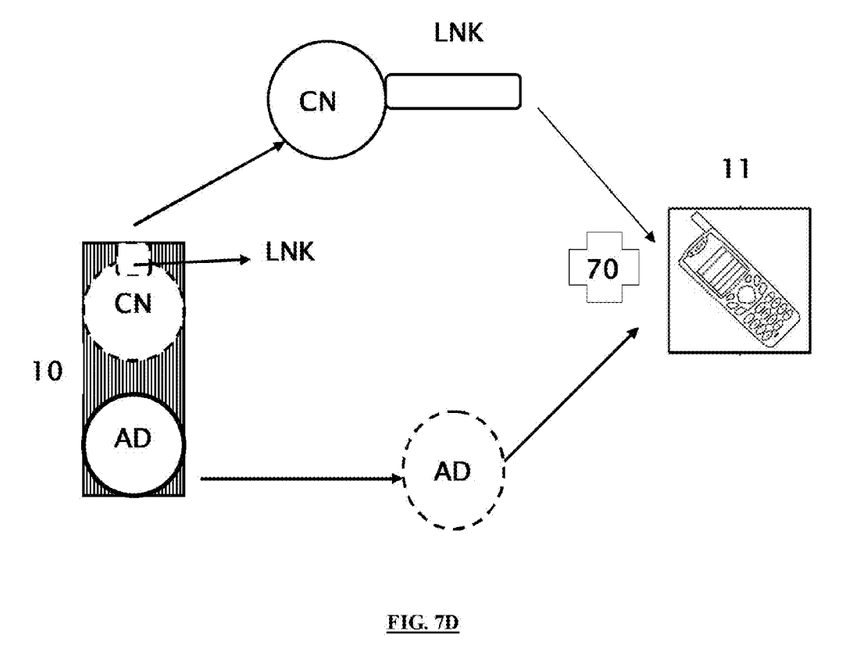
FIGS. 7D & 7E show method of transfer of contact information and advertisement from central server to remote communication device and subsequent linking of contact information and corresponding advertisement in the communication device.
Figure 7E:
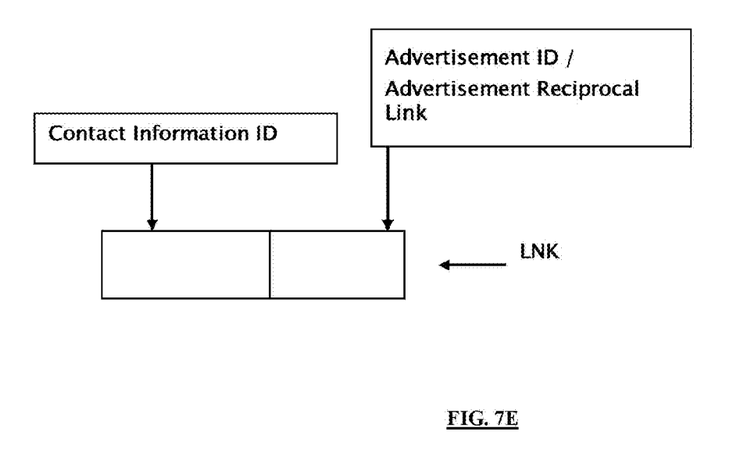

According to yet another method, as shown in FIGS. 7D & 7E; the contact information (CN) and corresponding link (LNK) is downloaded from central server into internal memory of communication device. Additionally, advertisements corresponding to contact information are also downloaded into internal memory of communication device. When contact information (CN) is retrieved by user from internal memory of communication device, link (LNK) corresponding to contact information is activated. Executable application is provided in communication device that uses the activated link (LNK) to fetch corresponding advertisement (70) from internal memory of communication device. The link (LNK) contains contact information ID and advertisement ID or advertisement reciprocal link. The advantage of this method is that the advertisement data in internal memory of communication device can easily be updated without the need to re download the contact information database from the central server. In the above methods, means is provided in the communication device to display advertisements, preferably when corresponding contact information is displayed on communication device and when corresponding contact information is retrieved from the contact list of communication device by caller.

Figure 8:
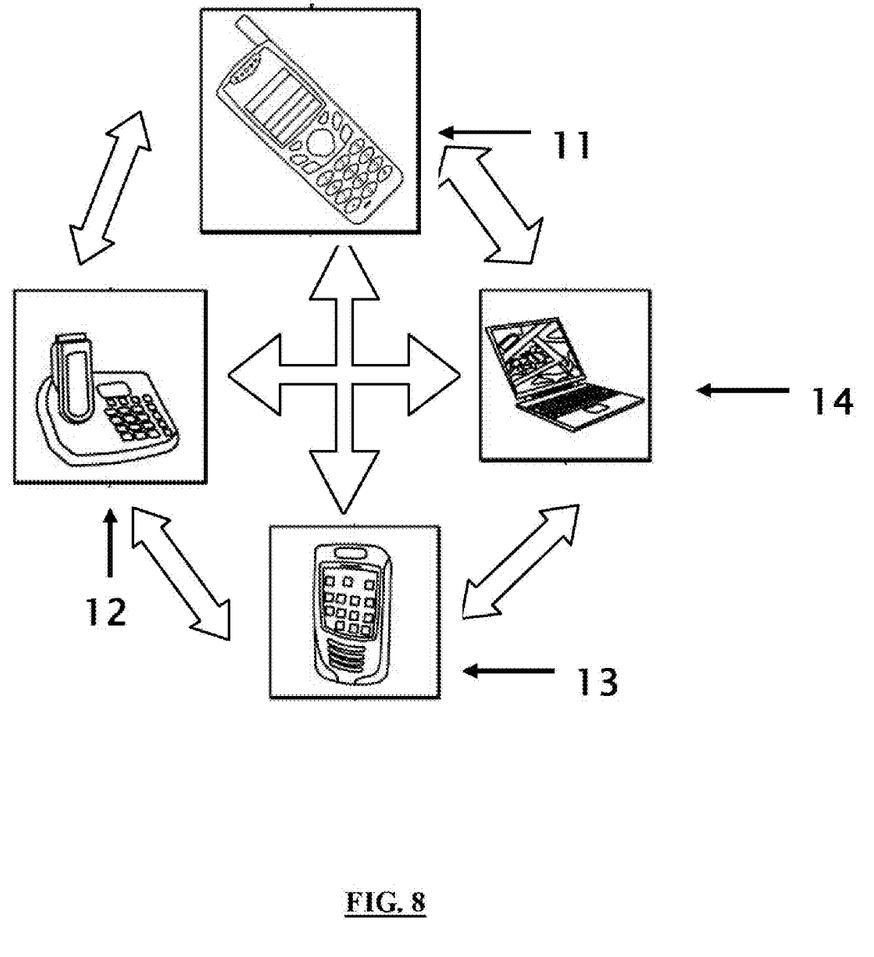
FIG. 8 illustrates the method of transfer of contact information data and advertisements paired therewith from first communication device to second communication device.
Figure 9:
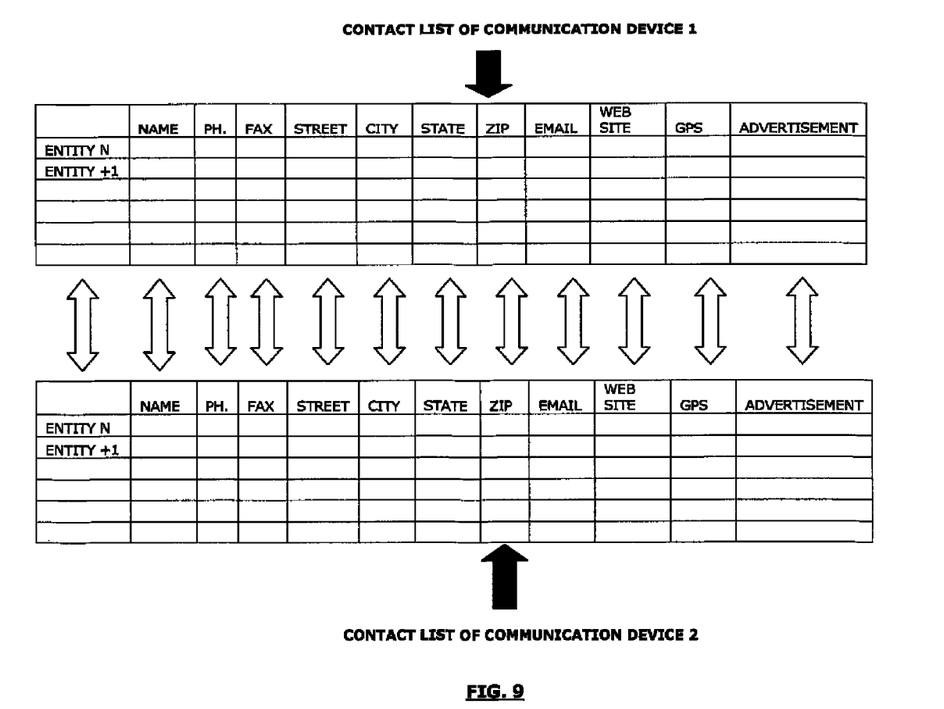
FIG. 9 illustrates the similarity of database structure of the contact list of first and second communication devices and also shows the method of transfer of data contained in one data field of the contact list of first communication device to the corresponding data field of the contact list of second communication device.
Figure 10:
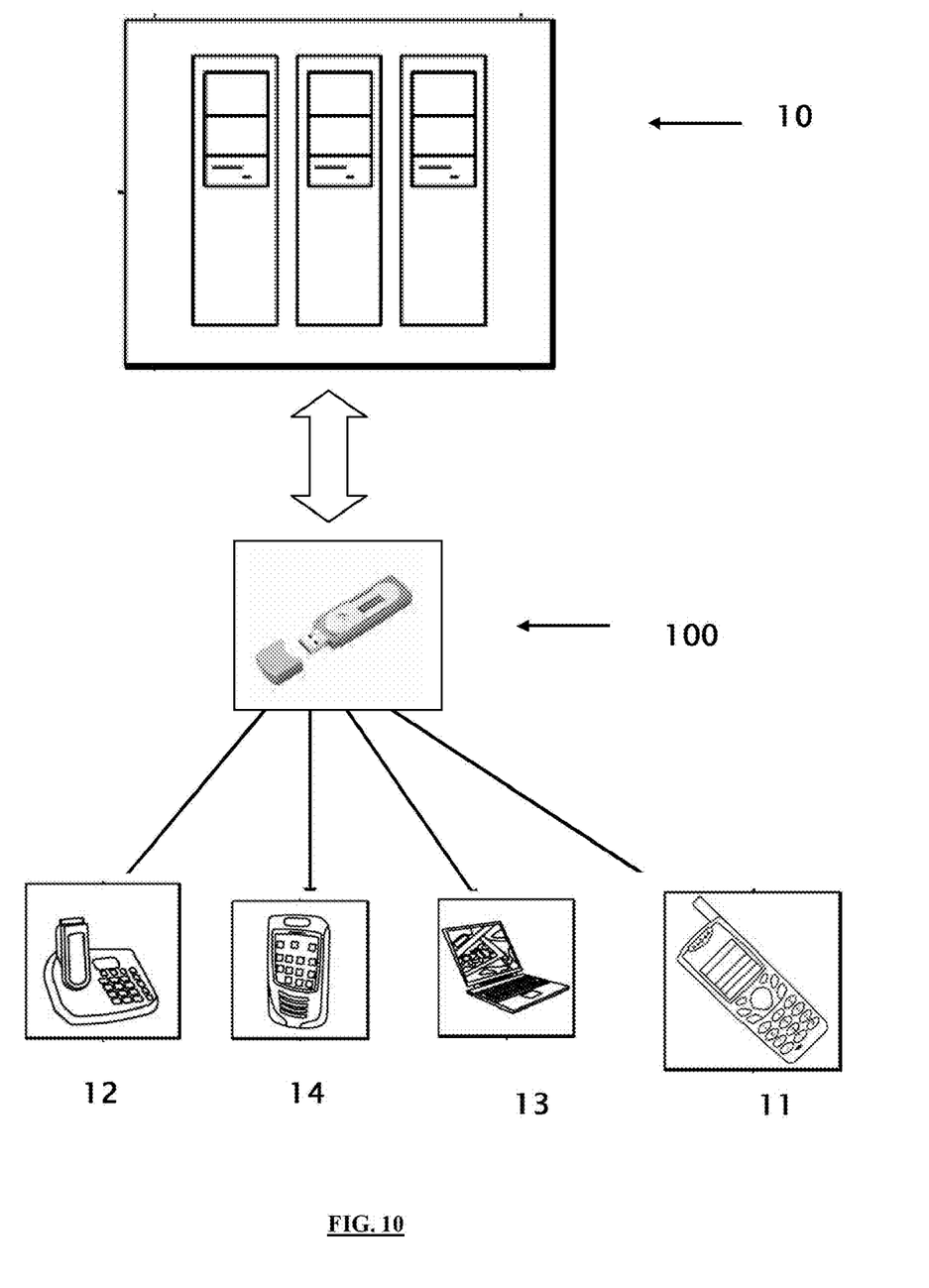
FIG. 10 shows a method of transfer of contact information data and advertisements from first communication device to second communication device wherein contact information data and corresponding advertisements is first downloaded from the 'central contact information' database into an external removable memory device, such as USB drive. Contact information data and corresponding advertisements can then be transferred from the external removable memory device to one or more communication devices.

According to another aspect of the invention, means is provided to transmit contact information and advertisement paired therewith from one communication device to another, as shown in FIGS. 8 & 9. In this method, the database structure of contact list of various communication devices is uniform; wherein data fields in contact list of first communication device is similar to data fields in contact list of second communication device, as shown in FIG. 9. Communication devices communicate with each other over wired network or wireless network. Means is provided for caller to transmit information contained in the contact list of first communication device to the contact list of second communication device. According to another method shown in FIG. 10, information contained in the 'central server' (10) is downloaded into an external memory device (100) such as CD-ROM, floppy disk, USB drive, etc. The external memory device (100) is configured to save contact information and corresponding advertisement (or link). Means is provided in communication device (11-14) to accept external memory device (100) and extract information contained therein. Means is provided in communication device (11-14) to save contact information and advertisement (or link) extracted from external memory device (100) into its contact list using principles illustrated in FIG. 9.

The invention is capable of other embodiments and of being practiced and carried out in various ways. As such, those skilled in the art will appreciate that the conception, upon which this disclosure is based, may readily be utilized as a basis for the designing of other structures, methods and systems for carrying out one or several purposes of the present invention. Some variations of the present inventions are: 1) in discussion of the present invention, contact information of local businesses is illustrated in many instances. However, this should not be considered limiting as contact information of businesses in any geographic area or contact information of other entities and individuals can be used similarly. 2) Cellular phone has been discussed in many instances as communication device, but the principles of present invention can be applied to other communication devices such as landline phone, fax machines, pager, personal computer, personal digital assistant (PDA), blackberry devices and the like. This list is by no means exhaustive. It is important, therefore, that the claims be regarded as including such equivalent constructions insofar as they do not depart from the spirit and scope of the present invention.

What is claimed is:

1. A system, comprising:
one or more computing devices;
a first centralized database having data fields for input of contact information; wherein the contact information included a link attached thereto responsive to a corresponding advertisement;
a second centralized database having data fields for input of advertisements;
a memory having instructions stored thereon that, when executed by one or more of the computing devices, cause one or more of the computing devices to perform operations comprising:
capturing contact information from the first centralized database for one or more contacts;
capturing advertisements from the second centralized database;
downloading and storing the captured contact information, link and advertisements into memory of a communication device;
receiving an input selecting a contact contained in the internal memory of the communication device;
transmitting to the one or more computing devices from the communication device an active link corresponding to the contact information;
linking contact information and corresponding advertisement responsive to the link within the communication device; and
displaying the contact information and the advertisement on the communication device.

2. The system of claim 1, wherein the first centralized database is populated by contacts who desire to make their contact information available for downloading to the communication and the second centralized database is populated by contacts who desire to have advertisements downloaded to the communication device together with their contact information.

3. The system of claim 1, further comprising:
associating a category with each of the contacts and displaying the contact list on the communication device with the corresponding contacts for the geographical area of the communication device location grouped by their category.

4. The system of claim 1, wherein the contacts are businesses offering services in the geographical area of the communication device location and wherein the advertisements include at least one of images, audio, and video.

5. The system of claim 1, wherein the contact information includes phone numbers and wherein the contact information is stored in memory of the communication device in such a manner that allows an operator to use the quick-dialing functionality of the communication device to dial a phone number of a given contact without requiring the operator to manually input the phone number into the dialing pad of the communication device.

6. The system of claim 1, wherein downloading includes downloading from a central server that is not physically attached to the communication device.

7. A method comprising:
providing a first database in a central server, the first database having data fields for input of contact information, wherein the contact information has a link attached thereto responsive to a corresponding advertisement;
providing a second database having data fields for input of advertisements;
downloading and storing the captured contact information and link into an internal memory of a communication device;
receiving an input selecting a contact contained in the internal memory of the communication device;
transmitting to the central server from the communication device an active link corresponding to the contact information;
linking the contact information and the corresponding advertisement responsive to the link; thereafter
transmitting the advertisement to the communication device; and
displaying the contact information and the advertisement on the communication device.

8. The method of claim 7, further comprising saving the advertisement in the internal memory of the communication device.

9. The method of claim 7, wherein providing the second database includes providing the second database in the central server.

10. The method of claim 7, further comprising capturing contact information from the first database for one or more contacts.

11. The method of claim 7, further comprising capturing advertisements from the second database.

12. The method of claim 7, wherein linking the contact information and the corresponding advertisement responsive to the link is performed within the central server.

13. The method of claim 7, further comprising: storing the contact information and advertisement into the internal memory of the communication device.

14. The method of claim 7, wherein linking the contact information and a corresponding advertisement responsive to the link is performed after receipt of the download request.

15. The method of claim 7, wherein the contact information corresponds to businesses offering services in the geographical area of the communication device.

* * * * *